(No Model.)  2 Sheets—Sheet 1.
T. LONGSHAW.
HAT FELTING AND SIZING MACHINE.
No. 323,171. Patented July 28, 1885.
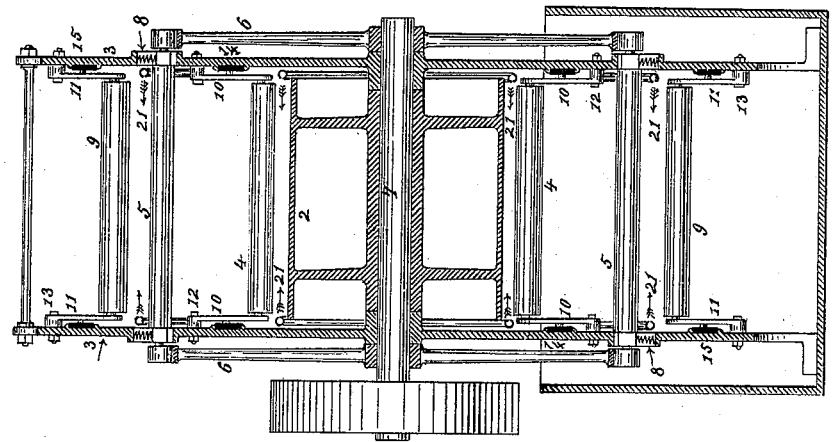
WITNESSES:
Christian Weber
C. Th. Wagner.
INVENTOR:
Thomas Longshaw
BY
Benj. A. Dare
ATTORNEY.

(No Model.) 2 Sheets—Sheet 2.
T. LONGSHAW.
HAT FELTING AND SIZING MACHINE.
No. 323,171. Patented July 28, 1885.
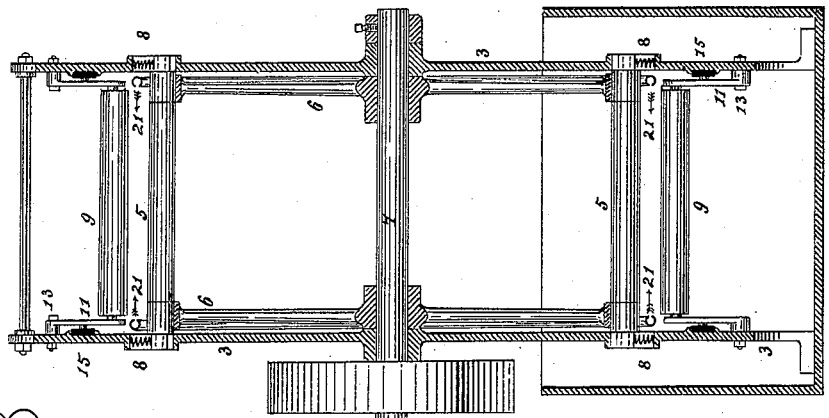
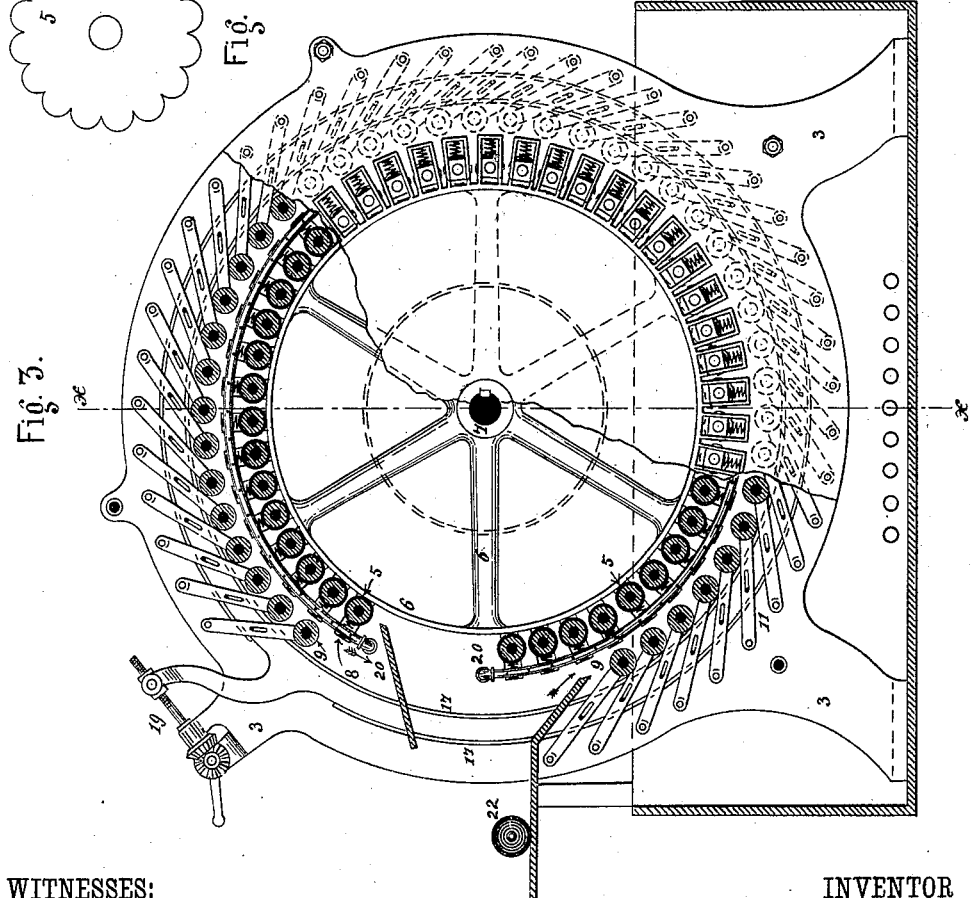
WITNESSES:
Christian Weber
C. Ph. Wagner.
INVENTOR
Thomas Longshaw
BY
Benj. A. Dare
ATTORNEY

UNITED STATES PATENT OFFICE.

THOMAS LONGSHAW, OF WATSESSING, NEW JERSEY.

HAT FELTING AND SIZING MACHINE.

SPECIFICATION forming part of Letters Patent No. 323,171, dated July 28, 1885.

Application filed January 30, 1885. (No model.)

*To all whom it may concern:*

Be it known that I, THOMAS LONGSHAW, a citizen of the United States, and a resident of Watsessing, in the county of Essex and State of New Jersey, have invented certain new and useful Improvements in Hat Felting and Sizing Machines, of which the following is a specification.

My invention relates to the class of machines where the roll of hats is rolled between a drum and series of adjustable pressure-rolls.

The object of my invention is that while the hat-rolls are green the movement is slow and the pressure light, and as they get harder they are moved more rapidly through the machine, and thereby increase the capacity of the machine.

In reference to the accompanying drawings, Figure 1 represents side elevation of machine, part in section. Fig. 2 is section of same on line $xx$, Fig. 1. Fig. 3 represents modification of Fig. 1. Fig. 4 is section of same on line $xx$, Fig. 3. Fig. 5 is enlarged section of pressure-rolls.

2 represents revolving drum journaled on suitable frame, 3, to which a series of pressure-rolls, 4, is attached around the outer circumference of the drum 2. The series of rolls 4 is encircled by another series of plain or fluted rolls, 5, which are journaled in frame 3, and extending beyond the said frame a sufficient distance to rest on the face of the pulleys 6 6, which are secured to the shaft 7 of the drum 2. The ends of the rolls 5 are held against the surface of said pulleys 6 6 by springs 8. Outside and encircling the rolls 5 there is another series of adjustable pressure-rolls, 9. The said rolls 9 and the rolls 4 are attached in a similar manner to frame 3, being journaled on the end of levers 10 and 11, which are pivoted to the frame 3 at 12 and 13, and operated by the slot and pin in the disks 14 and 15, and the said disks rotated in suitable guides 16 and 17 on inside of frame 3, and each independently adjusted by screws 18 and 19. At each end of passage for hats formed by the surface of drum 2, rolls 4, and rolls 5 and 9 I have a steam-pipe, 20, secured, which is perforated on the inside at 21, so as to admit a jet of steam onto the roll of hats as it is traveling between the rolls and keep same hot, which is an essential feature in hat-sizing.

The rolls of hats can be fed into and discharged from the machine by endless aprons, the direction being shown by arrows.

The whole machine is erected in a tank, which is provided with suitable coils for heating the water.

The drum 2 being revolved in direction of arrow, the roll of green hats 22 is fed in between the said drum 2 and pressure-rolls 4, which carries it around at a suitable speed consistent with the work, and when sufficient hardness is obtained it is then fed in between the rolls 5 and 9, where it travels at a faster rate of speed. As the pulleys 6 6 make one revolution in the same time as drum 2, and revolve the rolls 5 very rapidly by friction-contact on the surface of the pulleys 6 6, a suitable pressure is obtained on the roll of hats by the adjustable pressure-rolls 4 and 9.

In some instances I remove the drum 2 and pressure-rolls 4, as shown in Figs. 3 and 4, in which case the pulleys 6 6 are placed inside the frame, and the rolls 5 rest upon the surface, similar as heretofore described, and are operated in the above-stated manner.

The drum 2 may be dispensed with and a series of rolls substituted therefor and driven by pulleys on the drum-shaft, in a similar manner as shown in Figs. 3 and 4.

What I claim is—

1. In a hat felting and sizing machine, the rollers 5, in combination with the pulleys 6 6 and adjustable pressure-rolls 9, substantially as and for the purpose specified.

2. In a hat felting and sizing machine, the steam-pipes 20, provided with perforations 21, in combination with the drum 2 and pressure-rolls 9, substantially as and for the purpose specified.

3. In a hat felting and sizing machine, the revolving drum 2 and series of adjustable rolls 4, in combination with pulleys 6 6, rolls 5, pressure-rolls 9, adjusting-screws 18 and 19, and steam-pipes 20, provided with perforations 21, substantially as and for the purpose specified.

Signed at Bloomfield, in the county of Essex and State of New Jersey, this 20th day of January, A. D. 1885.

THOMAS $\overset{\text{his}}{+}$ LONGSHAW.
<div style="text-align:center">mark.</div>

Witnesses:
T. E. HAYES,
J. W. BALDWIN.